(12) United States Patent
Kwon et al.

(10) Patent No.: US 6,360,149 B1
(45) Date of Patent: Mar. 19, 2002

(54) DUAL POSITION VEHICLE STEERING COMMAND MODULE

(75) Inventors: Ki C. Kwon, Troy; Ronald Henry Dybalski, Oxford; Vincent Lee Brooks, Troy, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/456,446

(22) Filed: Dec. 8, 1999

Related U.S. Application Data

(60) Provisional application No. 60/111,460, filed on Dec. 9, 1998.

(51) Int. Cl.[7] .............................. B63H 25/04; B62D 7/00
(52) U.S. Cl. .............................. 701/41; 701/1; 172/278; 477/1; D12/175; 116/31; 114/144 R; 29/894.1
(58) Field of Search ................................. 701/41, 53, 1; 29/894.1; 114/144 R; 116/31; 172/278; 475/18; 477/1; 180/6.2, 6.54, 400; D12/175; 244/236, 228, 175

(56) References Cited

U.S. PATENT DOCUMENTS

| T875,019 | I4 |   | 6/1970 | Haddad et al. |           |
|----------|----|---|--------|---------------|-----------|
| 4,004,537 | A | * | 1/1977 | Nilsson ........................ | 114/144 |
| 5,522,568 | A | * | 6/1996 | Kamen et al. ............ | 244/17.13 |
| 6,097,286 | A | * | 8/2000 | Discenzo ................... | 340/465 |
| 6,184,637 | B1 | * | 2/2001 | Yamawaki et al. ......... | 318/432 |

FOREIGN PATENT DOCUMENTS

JP             62055263        10/1987

\* cited by examiner

Primary Examiner—William A. Cuchlinski, Jr.
Assistant Examiner—Olga Hernandez
(74) Attorney, Agent, or Firm—Kathryn A. Marra

(57) ABSTRACT

A vehicle steering command module as disclosed wherein the command module is necessary to start and control the motion of a vehicle, and once removed from the vehicle the command module can function as a personal computer. The vehicle steering command module includes a housing having a computer processing unit and a connection port. The connection port releasably connects the command module to one of a pair of spaced apart mating connection ports on an instrument panel of the vehicle, thereby completing a steer by wire circuit of the vehicle. Rotation of the command module controls the direction of travel of the vehicle when the command module is connected to one of the mating connection ports. The command module includes at least one input device operably connected to the computer processing unit. A cover of the steering command module is moveable between a closed position and an opened position, and includes a display screen operably connected to the computer processing unit. The steering command module further includes a pair of opposed handles, which are moveable between a retracted position and a plurality of extended positions.

16 Claims, 4 Drawing Sheets

DUAL POSITION VEHICLE STEERING COMMAND MODULE

This application claims the benefit of U.S. Provisional Application No. 60/111,460, filed Dec. 9, 1998.

TECHNICAL FIELD

This invention relates to a vehicle steering command module for a vehicle wherein the command module is necessary to start and control the motion of the vehicle and once removed from the vehicle the command module can function as a personal computer.

BACKGROUND OF THE INVENTION

Typically, a vehicle includes a steering wheel rotation of which is used to control the direction of travel of the vehicle. The typical steering wheel requires numerous gears and mechanical linkages in order to effectuate turning of a pair of road wheels of the vehicle. In addition, a typical vehicle requires some sort of a key or starting mechanism in order to permit movement of the vehicle. Recently, a number of steer-by-wire systems have been developed for vehicles. Steer-by-wire systems eliminate a large number of the gears normally associated with a steering system. Electrical signals are used to control the direction of travel of the vehicle in a steer-by-wire system.

Technological advances in the computer industry have permitted ever smaller and more powerful computers to be developed. Computers are increasingly being integrated into vehicle systems for control of vehicle functions. It would be advantageous to provide a computer which could be releasably connected to the vehicle and which permitted a user to control various functions including steering of the vehicle when connected to the vehicle. It would be additionally advantageous if the computer, when released from the vehicle, could function as a personal computer. Preferably, connection of the personal computer to the vehicle could also serve as a key function to enable ignition of the vehicle's engine.

One disadvantage of current vehicle steering systems is that the manufacturer has to select between mounting the steering wheel on the left, per American convention, or on the right, per European convention. For an international vehicle manufacturer this presents problems in that the same parts can not be used in each design, and thus it necessitates many similar non-interchangeable parts. It would be advantageous to provide a steering system that could readily and easily be used on either end of an instrument panel of a vehicle. It would be most preferable if a user could select and change the position of the steering control between the right and the left.

SUMMARY OF THE INVENTION

The present invention provides alternatives and advantages over the prior art by providing a dual position vehicle steering command module, which is necessary in order to start and control the motion of the vehicle. The vehicle steering command module functions as a personal computer when not connected to the vehicle. The vehicle steering command module permits a user to steer the vehicle from either side of the vehicle and to control all the functions of the vehicle through the command module including steering and environmental conditions of the vehicle.

In a first embodiment, the dual position vehicle steering command module comprises an instrument panel of a vehicle, the instrument panel having a first mating connection port spaced opposite a second mating connection port. A vehicle steering command module comprises a housing having a computer processing unit and a connection port, the connection port releasably connects the command module to either the first or the second mating connection port of the instrument panel and thereby completes a steer by wire circuit of the vehicle. Rotation of the command module controls the direction of travel of the vehicle when the command module is connected to one of the mating connection ports. The command module has at least one input device operably connected to the computer processing unit and a cover movable between a closed position and an open position. The cover has a display screen operably connected to the computer processing unit. The command module also has a pair of opposed handles.

BRIEF DESCRIPTION OF THE DRAWINGS

The invention will now be described, by way of example, with reference to the accompanying drawings, in which.

DESCRIPTION OF THE PREFERRED EMBODIMENT

Figure 1:
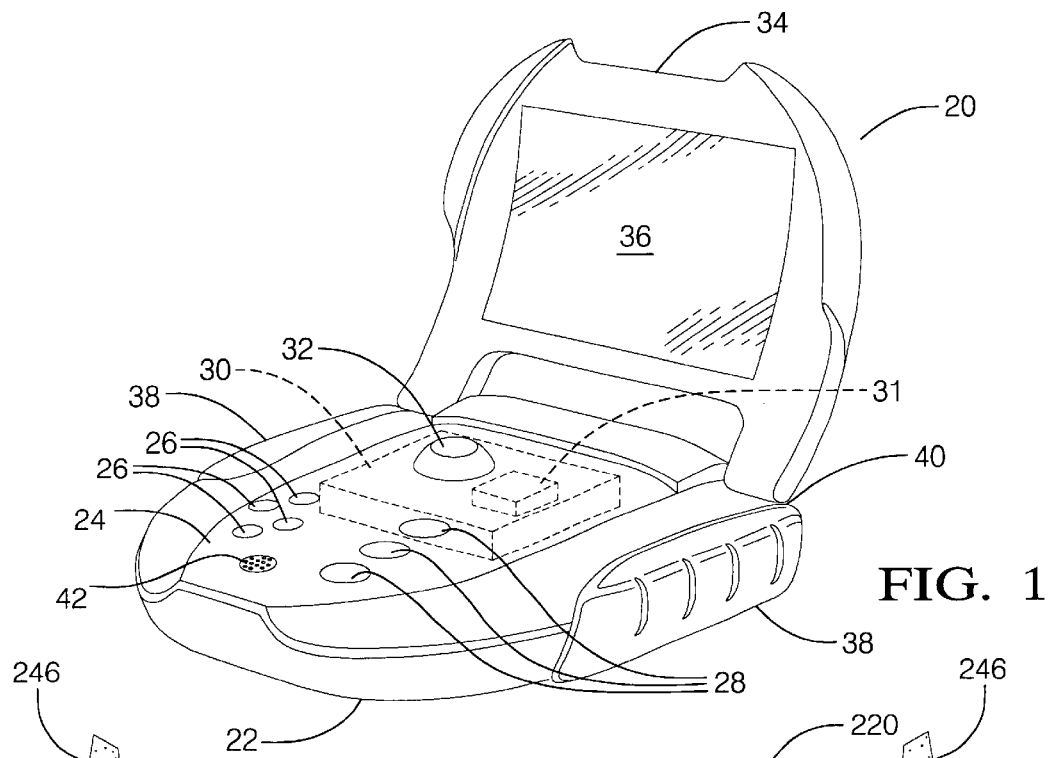
FIG. 1 is a perspective view of one embodiment of a vehicle steering command module with its cover in an open position.

Referring to FIG. 1, a vehicle steering command module is shown generally at 20. Command module 20 includes a housing 22 having a faceplate 24. Faceplate 24 includes a plurality of control switches 26 and indicator lights 28. Control switches 26 can be used to control the basic functions of command module 20 such as for example on/off operation mode etc. as is known in the art. Indicator lights 28 provide an indication of the status of command module 20 such as, for example, on/off, disc drive active, and mode of operation etc. Housing 22 further includes a computer processing unit (CPU) 30 having a memory module 31. An input device in the form of a trackball type mouse 32 is located in faceplate 24 and is operably connected to the CPU 30. Command module 20 further includes a cover 34 having a display screen 36, which is operably connected to the CPU 30. A hinge member 40 permits cover 34 to move between a closed position where cover 34 is adjacent faceplate 24 and a plurality of open positions, one of which is shown in FIG. 1. A latch (not shown) secures cover 34 in the closed position until the latch is actuated by a user. A pair of opposed handles 38 are located on opposite sides of the housing 22. Handles 38 are movable between a retracted position, as shown in FIG. 1, and a plurality of extended positions as shown below. When the command module 20 is connected to the vehicle and the handles 38 are in one of the extended positions, then the input devices to the command module 20 are disabled. Housing 22 includes a microphone 42 to permit voice activation and control of the command module 20.

The back of housing 22 includes a plurality of input/output ports (not shown) as are known in the art. These include ports such as, for example: a serial port; an external keypad/keyboard port; an external power input; a swappable disc bay for zip drives, floppy and hard disc drives, CD ROM drives, DVD drives etc.; a parallel port; a modem; a card ports; a game port; a docking port; and a universal service bus port.

Command module 20 may include input devices in addition to mouse 32 as are known in the art. For example, an external keyboard or joystick connected through a port in the rear of the housing 22. Also display screen 36 may be a touch sensitive screen similar to those currently found on personal information managers. Preferably, display screen 36 is a LCD flat screen. The bottom of housing 22 includes a port, shown below, that permits command module 20 to be releasably connected to a mating port in a vehicle as described below. When command module 20 is not connected to the mating port on the vehicle, it functions as a personal computer and has all the normal functions of a personal computer.

Figure 2:
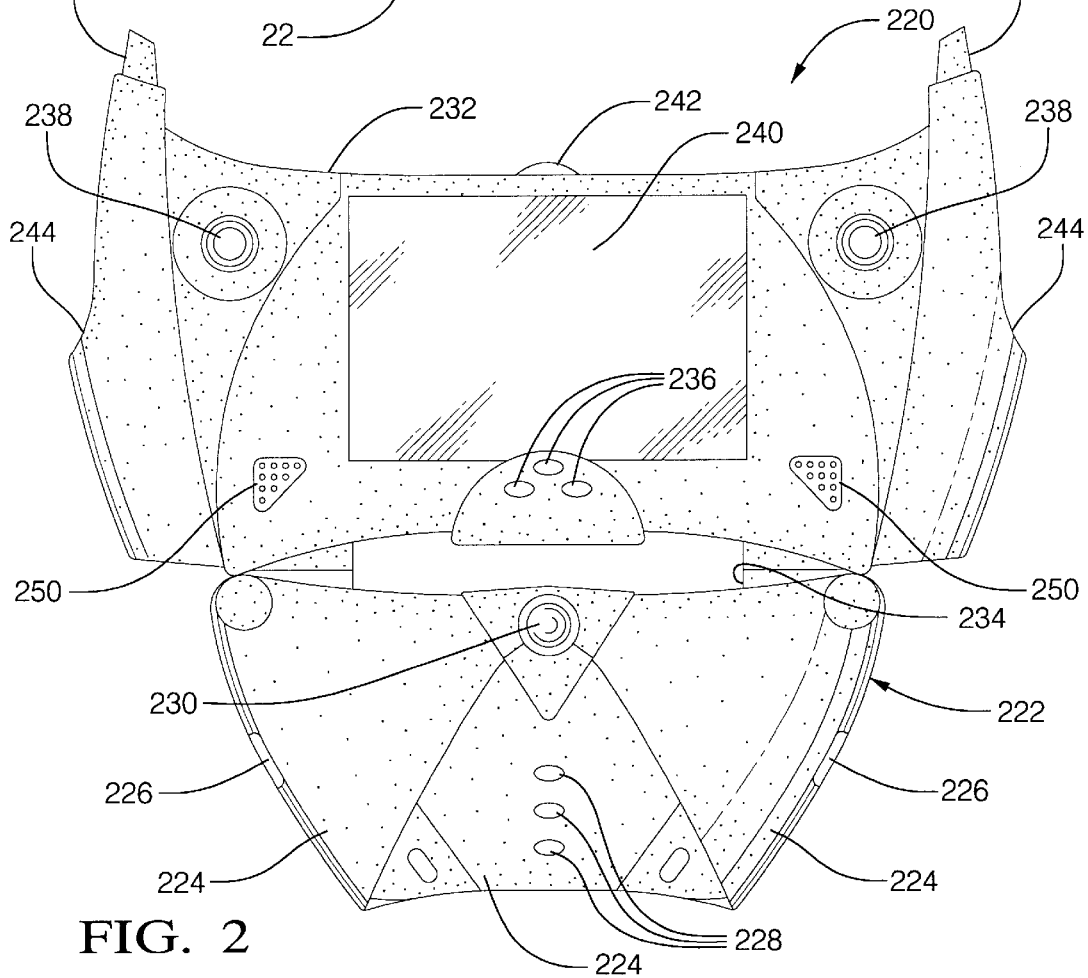
FIG. 2 is front view of an alternative embodiment of the steering command module with its cover in an open position.
Figure 3:
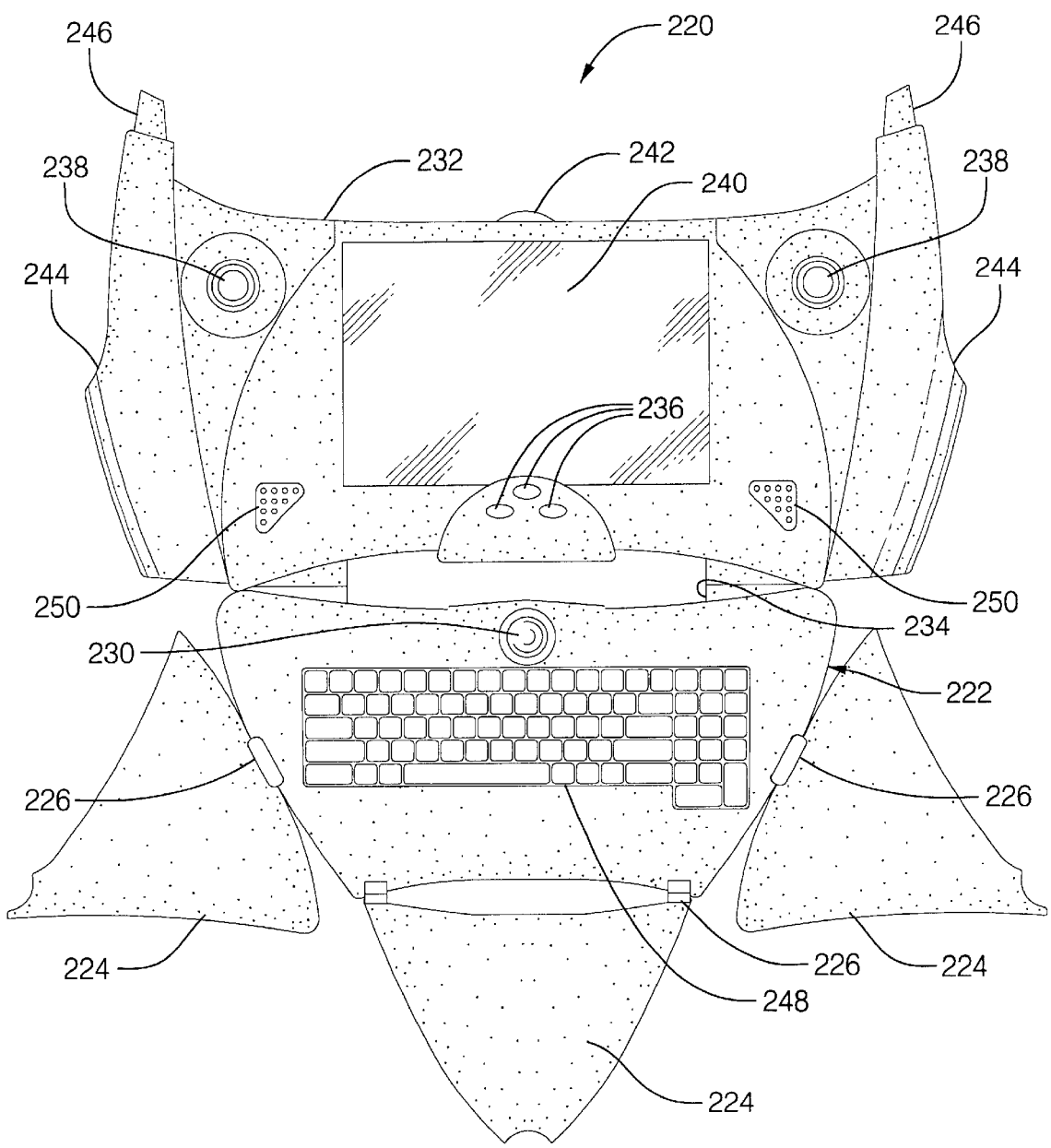
FIG. 3 is a front view of the command module shown in FIG. 2 with the keyboard covers in an open position.

In FIG. 2, an alternative embodiment of the vehicle steering command module is shown at 220. Command module 220 includes a housing 222 having a plurality of keyboard covers 224 each with at least one hinge 226 to the housing 222. As will be understood by one of ordinary skill in the art, command module 220 could also be made with only a single keyboard cover. Housing 222 includes a CPU and at least one memory module (not shown) as described above. A plurality of indicator lights 228 are located on one of the covers 224. The indicator lights 228 function as described above. The housing 222 further includes an input device in the form of a mouse 230 operably connected to the CPU. A cover 232 is connected to housing 222 through a pair of hinge members 234 and is pivotable between a closed position and a plurality of open positions, one of which is shown in FIG. 2. Cover 232 includes a plurality of control switches 236 for controlling command module 220. Cover 232 also includes at least one thumb mouse 238 as is known in the art. A display screen 240 is located in cover 232 and is preferably a LCD flat screen. A releasable latch 242 secures cover 232 in the closed position. Cover 232 includes a pair of opposed handles 244, which are movable between a retracted position, as shown, to a plurality of extended positions. Located on each handle 244 is a switch 246, which may function as a turn signal as described below. A pair of speakers 250 are mounted in cover 232 to provide sound generated by the CPU. In FIG. 3, vehicle steering command module 220 is shown with the keyboard covers 224 in an open position to display a keyboard 248.

The back of housing 222 includes a plurality of input/output ports (not shown) as are known in the art. These include ports such as, for example: a serial port; an external keypad port; an external power input; a swappable disc bay for zip drives, floppy and hard disc drives, CD ROM drives, DVD drives etc.; a parallel port; a modem; a card port; a game port; a docking port; and a universal service bus port.

Command module 220 may include input devices in addition to mouse 230, 238 and keyboard 248 as are known in the art. For example, a joystick connected through a port in the rear of the housing 222. Also display screen 240 may be a touch sensitive screen similar to those currently found on personal information managers. The back of cover 232 includes a port, like that of housing 22 of command module 20, that permits command module 220 to be releasably connected to a mating port in a vehicle as described below. When command module 220 is not connected to the mating port on the vehicle, it functions as a personal computer and has all the normal functions of a personal computer.

Figure 4:
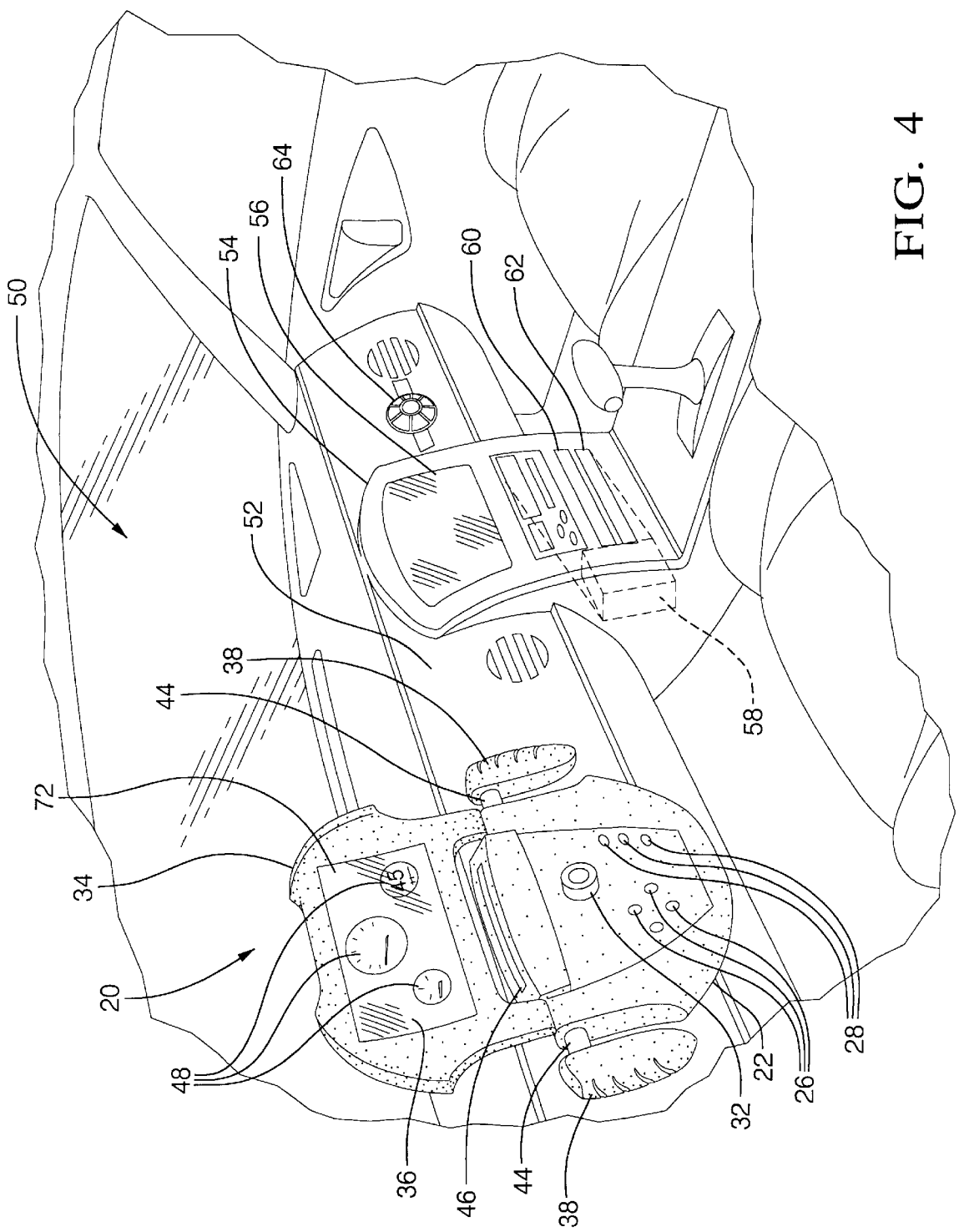
FIG. 4 is a front view of the vehicle steering command module shown in FIG. 1 installed in a vehicle.

In FIG. 4 the vehicle steering command module 20 is shown installed in a vehicle interior 50. The command module 20 includes a connection port 70 that releasably connects to a mating connection port 64 in an instrument panel 52. In preferred embodiment, the vehicle interior 50 includes a connection port 64 both on the left and the right ends of the instrument panel 52, as shown. This permits the steering and control of the vehicle to be accomplished from either side of the vehicle. A user can readily release the command module 20 from the right end mating connection port (not shown) and swap it to the left end mating connection port 64. The mating connection port 64 may take any of several forms as are known in the art. It may comprise a plug and play connection, a plug in connection, a bayonet type locking connection, or it may include a pair of locking tabs. The essentials of the connection port 64 are that it securing and releasably lock the command module 20 to the instrument panel 52 and establish the electrical connections between the command module 20 and a steer by wire system of the vehicle. Because each mating connection port 64 connects to the steer by wire system a user can operate the vehicle with the command module 20 plugged into either mating connection port 64. In FIG. 4 the handles 38 are shown in one of their extended positions. Each of the handles 38 are attached to a rail 44 that guides the handle 38 between the retracted position and a plurality of user selectable extended positions. The rails 44 include either a latch or a motor (not shown) to permit movement between the positions and to secure the handles 38 in a user selected position. This permits the diameter between the handles 38 to be custom fit for a given user.

Vehicle interior 50 further includes a vehicle computer processing unit (CPU) 58. Preferably the CPU 58 is mounted into a center console 54 and is operably connected to a display screen 56. Display screen 56 preferably is a LCD flat screen and may be touch sensitive. Center console 54 also preferably includes a variety of devices operably connected to CPU 58 such as, for example, a DVD drive 60 and a CD ROM drive 62. When command module 20 is connected to connection port 64 it is also operably connected to CPU 58. Thus, a user can access CPU 58 through command module 20. The vehicle CPU 58 is used to control the vehicle's functions including its steer by wire system described below. The command module 20 permits a user to control the vehicle functions through the CPU 58. The CPU 58 is used to set all of the vehicle functions such as, for example: climate control; seat adjustment preferences; ride, handling and suspension preferences; and mirror positions. Through command module 20 a user can display the functions on display screen 36 and adjust any of these functions. The vehicle steer by wire system is described below.

When command module 20 is connected to connection port 64 the display screen 36 displays a user selectable combination of gages 48 or displays. These gages 48 may display, for example, engine temperature, vehicle speed, fuel level, oil pressure, engine rpms, odometer readings, a compass, battery charge level, and any other typical informational displays. The command module 20 allows a user to select which information will be displayed, where it will be displayed on display screen 36 and how it will be displayed, ie. as a dial or digitally. The rear of housing 22 includes a port cover 46 that covers the ports and drive bays described above.

Vehicle steering command module 20 is used in a vehicle having a steer by wire system controlled by CPU 58. Steer by wire vehicle steering systems steer a set of road wheels of a vehicle. The system comprises the CPU 58 and at least one actuator assembly operably connected to the CPU 58 and to at least one wheel of the set of road wheels. The actuator assembly controls the rotational position of the at least one wheel. The actuator assembly comprises an electromechanical actuator operably connected to the CPU 58, a crank arm connected to the electromechanical actuator, a steering arm connected to the at least one wheel of the set of road wheels; and a tie rod having a first end thereof connected to the crank arm and a second end thereof connected to the steering arm. The electro-mechanical actuator, in response to a steering signal from the CPU 58, is operative to rotate the crank arm producing thereby a force acting through the tie rod so as to rotate the steering arm and the at least one road wheel to a desired position. The steer by wire system preferably includes an actuator assembly operably connected to each of the front wheels of a vehicle. The steer-by-wire steering system includes a backup system capable of assuming operative command of the at least one wheel of the road wheels.

The command module 20 functions as a circuit completion device for the steer by wire system. Thus, when command module 20 is not connected to a connection port 64 the vehicle is not operable because the circuit is open. When command module 20 is connected to one of the connection ports 64 the circuit is closed and the vehicle is operable. Thus, the command module 20 can be thought of to function like an ignition interrupt feature of known vehicle alarm systems. Connection of the command module 20 to connection port 64 provides power to command module 20 from the vehicle battery. Rotation of command module 20 about connection port 64 sends steering signal commands to the CPU 58. Then CPU 58 sends a steering command to the at least one actuator assembly to rotate the at least one road wheel to the desired degree to steer the vehicle. The command module 20 thus also functions as an anti-theft device, without it the vehicle is inoperable. Command module 20 can also be used to control the acceleration and braking of the vehicle through throttle signals and braking signals that are processed by the CPU 58 to carry out the user selected changes.

Figure 5:
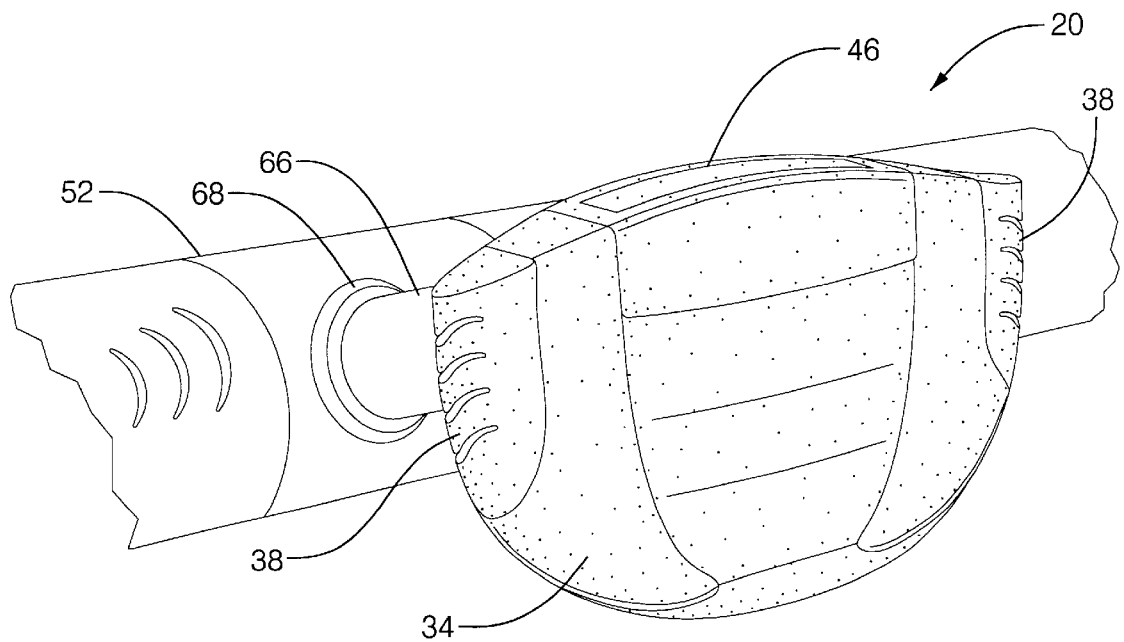
FIG. 5 is a front view of the vehicle steering command module of FIG. 1 installed in a vehicle.

In FIG. 5 a close up of command module 20 connected to instrument panel 52 is shown. Preferably each connection port 64 is mounted to a support beam 66 that extends through an aperture 68 in instrument panel 52. The support beam 66 is able to telescope in and out to a user selectable position and in addition can be tilted to a user-desired position. Preferably support beam 66 is formed from aluminum and operates via air pressure.

Figure 6:
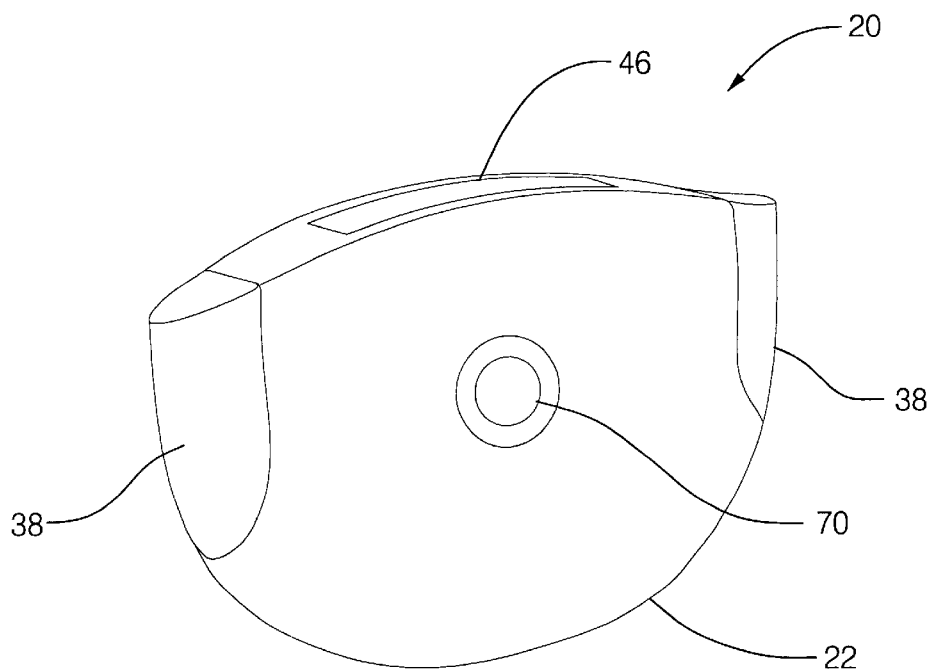
FIG. 6 is a rear view of the steering command module of FIG. 1.

In FIG. 6 a bottom view of command module 20 is shown. Command module 20 includes a port 70, representated schematically, which mates to connection ports 64 on instrument panel 52. Port 70 is shown schematically because it may comprise any of a number of known connections including plug in, bayonet type, or a tabbed connection as discussed above. The only requirement is that the connection releasably secure command module 20 to connection port 64 that is establish an electrical connection to the CPU 58. Command module 20 further includes a securing mechanism 72 in the form of either a latch or a motor, which enables a user to select the diameter between the handles 38 and releasably secures the handles 38 at a user selected position.

What is claimed is:

1. A dual position vehicle steering command module comprising:

an instrument panel of a vehicle, said instrument panel having a first mating connection port and a second mating connection port spaced from the first mating connection port;

a vehicle steering command module comprising a housing having a connection port, said connection port for releasably connecting said command module to said first or said second mating connection ports of said instrument panel and thereby completing a steer by wire circuit of said vehicle;

said command module for controlling the direction of travel of said vehicle when said command module is connected to one of said mating connection ports, and said command module includes a computer processing unit such that said command module can be operated as a personal computer when the command module is disconnected from mating connection ports of the vehicle.

2. A dual position vehicle steering command module comprising:

an instrument panel of a vehicle, said instrument panel having a first mating connection port and a second mating connection port spaced from the first mating connection port;

a vehicle steering command module comprising a housing having a connection port, said connection port for releasably connecting said command module to said first or said second mating connection ports of said instrument panel and thereby completing a steer by wire circuit of said vehicle;

said command module for controlling the direction of travel of said vehicle when said command module is connected to one of said mating connection ports, and the command module includes a computer processing unit and wherein the command module includes at least one input device operably connected to said computer processing unit.

3. A vehicle steering command module as recited in claim 2, wherein said at least one input device comprises a mouse.

4. A dual position vehicle steering command module comprising:

an instrument panel of a vehicle, said instrument panel having a first mating connection port and a second mating connection port spaced from the first mating connection port;

a vehicle steering command module comprising a housing having a connection port, said connection port for releasably connecting said command module to said first or said second mating connection ports of said instrument panel and thereby completing a steer by wire circuit of said vehicle;

said command module for controlling the direction of travel of said vehicle when said command module is connected to one of said mating connection ports, and wherein a cover (34) is connected to said command module and movable between a closed position and an open position, said cover having a display screen.

5. A dual position vehicle steering command module comprising:

an instrument panel of a vehicle, said instrument panel having a first mating connection port and a second mating connection port spaced from the first mating connection port;

a vehicle steering command module comprising a housing having a connection port, said connection port for releasably connecting said command module to said first or said second mating connection ports of said instrument panel and thereby completing a steer by wire circuit of said vehicle;

said command module for controlling the direction of travel of said vehicle when said command module is connected to one of said mating connection ports, and wherein said housing further includes at least one keyboard cover movable between a closed and an open position and a keyboard; said keyboard accessible when said cover is in said open position and said keyboard not accessible when said cover is in said closed position.

6. A vehicle steering command module as recited in claim 5, wherein said cover further includes a pair of speakers.

7. A dual position vehicle steering command module comprising:

an instrument panel of a vehicle, said instrument panel having a first mating connection port and a second mating connection port spaced from the first mating connection port;

a vehicle steering command module comprising a housing having a connection port, said connection port for releasably connecting said command module to said first or said second mating connection ports of said instrument panel and thereby completing a steer by wire circuit of said vehicle;

said command module for controlling the direction of travel of said vehicle when said command module is connected to one of said mating connection ports, and wherein said command module includes a computer processing unit and wherein said housing further includes a plurality of input and output ports, each of said ports operably connected to said computer processing unit.

8. A dual position vehicle steering command module comprising:

an instrument panel of a vehicle, said instrument panel having a first mating connection port and a second mating connection port spaced from the first mating connection port;

a vehicle steering command module comprising a housing having a connection port, said connection port for releasably connecting said command module to said first or said second mating connection ports of said instrument panel and thereby completing a steer by wire circuit of said vehicle;

said command module for controlling the direction of travel of said vehicle when said command module is connected to one of said mating connection ports, and wherein said command module includes a display screen and wherein said display screen displays a plurality of vehicle information gages when said command module is connected ton one of said mating connection ports.

9. A dual position vehicle steering command module comprising:

an instrument panel of a vehicle, said instrument panel having a first mating connection port and a second mating connection port spaced from the first mating connection port;

a vehicle steering command module comprising a housing having a connection port, said connection port for releasably connecting said command module to said first or said second mating connection ports of said instrument panel and thereby completing a steer by wire circuit of said vehicle;

said command module for controlling the direction of travel of said vehicle when said command module is connected to one of said mating connection ports, and wherein connection of said command module to one of said mating connection ports enables a user to modify a plurality of preset vehicle settings.

10. A vehicle steering command module comprising:

an instrument panel of a vehicle, said instrument panel having at least one mating connection port;

a vehicle steering command module comprising a housing having a connection port, said connection port for releasably connecting said command module to said mating connection port of said instrument panel and thereby completing a steer by wire circuit of said vehicle;

said command module for controlling the direction of travel of said vehicle when said command module is connected to said mating connection port, and said command module including a computer processing unit such that said command module can be operated as a personal computer when the command module is disconnected from mating connection port of the vehicle.

11. A vehicle steering command module comprising:

an instrument panel of a vehicle, said instrument panel having at least one mating connection port;

a vehicle steering command module comprising a housing having a connection port, said connection port for releasably connecting said command module to said connection port of said instrument panel and thereby completing a steer by wire circuit of said vehicle;

said command module for controlling the direction of travel of said vehicle when said command module is connected to said mating connection port, and the command module including a computer processing unit and wherein the command module includes at least one input device operably connected to said computer processing unit.

12. A vehicle steering command module comprising:

an instrument panel of a vehicle, said instrument panel having at least one mating connection port;

a vehicle steering command module comprising a housing having a connection port, said connection port for releasably connecting said command module to said mating connection port of said instrument panel and thereby completing a steer by wire circuit of said vehicle;

said command module for controlling the direction of travel of said vehicle when said command module is connected to said mating connection port, and wherein a cover is connected to said command module and movable between a closed position and an open position, said cover having a display screen.

13. A vehicle steering command module comprising:

an instrument panel of a vehicle, said instrument panel having a mating connection port;

a vehicle steering command module comprising a housing having a mating connection port of said instrument panel and thereby completing a steer by wire circuit of said vehicle;

said command module for controlling the direction of travel of said vehicle when said command module is connected to said mating connection port, and wherein said housing further includes at least one keyboard cover movable between a closed and an open position and a keyboard; said keyboard accessible when said cover is in said open position and said keyboard not accessible when said cover is in said closed position.

14. A vehicle steering command module comprising:

an instrument panel of a vehicle, said instrument panel having a mating connection port;

a vehicle steering command module comprising a housing having a connection port, said connection port for releasably connecting said command module to said mating connection port of said instrument panel and thereby completing a steer by wire circuit of said vehicle;

said command module for controlling the direction of travel of said vehicle when said command module is connected to said mating connection port, and wherein said command module includes a computer processing unit and wherein said housing further includes a plurality of input and output ports, each of said ports operably connected to said computer processing unit.

15. A vehicle steering command module comprising:

an instrument panel of a vehicle, said instrument panel having a mating connection port;

a vehicle steering command module comprising a housing leaving a connection port, said connection port for releasably connecting said command module to said mating connection port of said instrument panel and thereby completing a steer by wire circuit of said vehicle;

said command module for controlling the direction of travel of said vehicle when said command module is connected to said mating connection port, and wherein said command module includes a display screen and wherein said display screen displays a plurality of vehicle information gages when said command module is connected to said mating connection port.

16. A vehicle steering command module comprising:

an instrument panel of a vehicle, said instrument panel having a mating connection port;

a vehicle steering command module comprising a housing having a connection port, said connection port for releasably connecting said command module to said mating connection port of said instrument panel and thereby completing a steer by wire circuit of said vehicle;

said command module for controlling the direction of travel of said vehicle when said command module is connected to said mating connection port, and wherein connection of said command module to said mating connection port enables a user to modify a plurality of preset vehicle settings.

* * * * *